April 29, 1930. S. D. BLACK ET AL 1,756,807
VEHICLE SEAT
Filed April 8, 1927 2 Sheets-Sheet 2
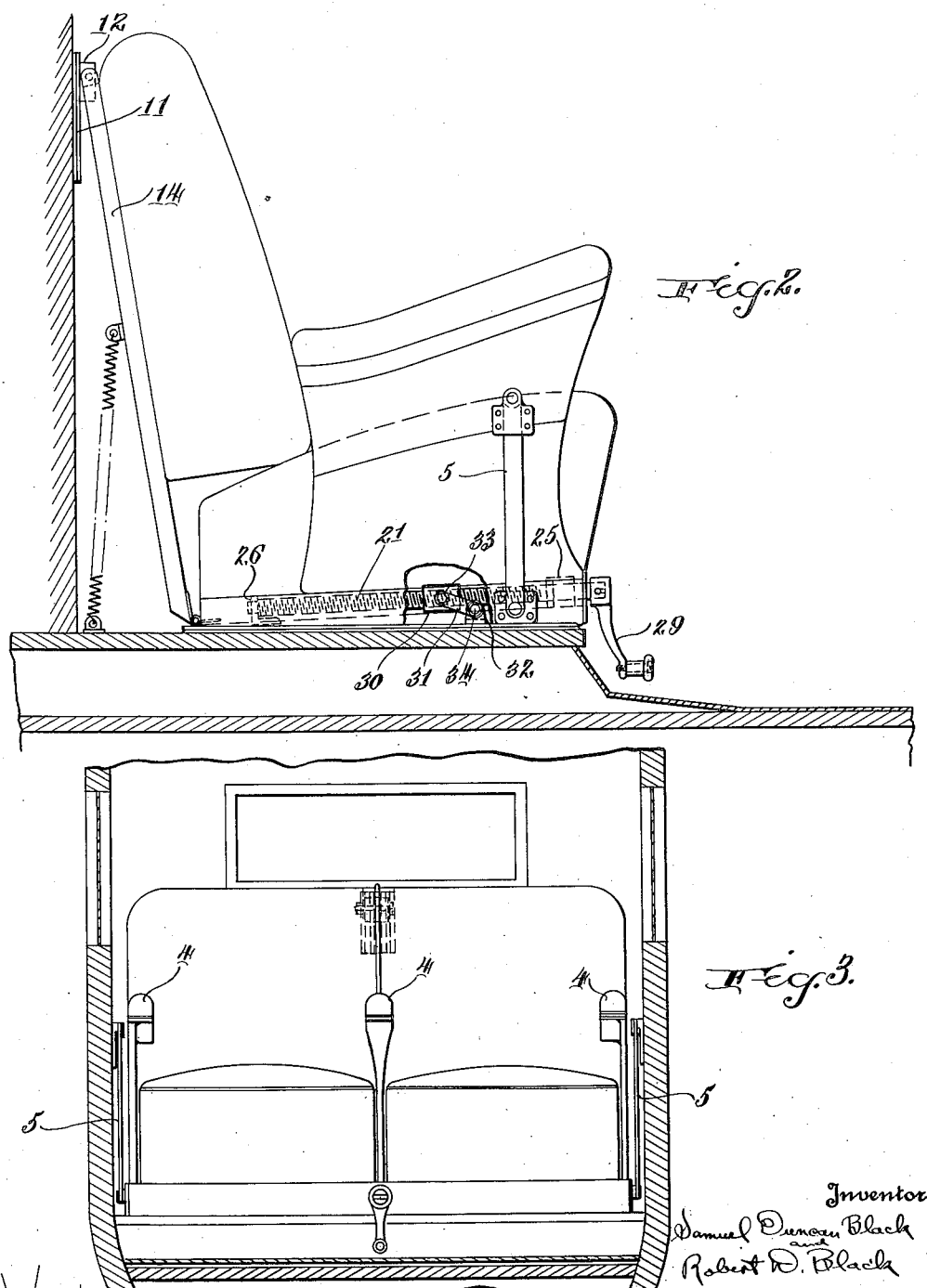

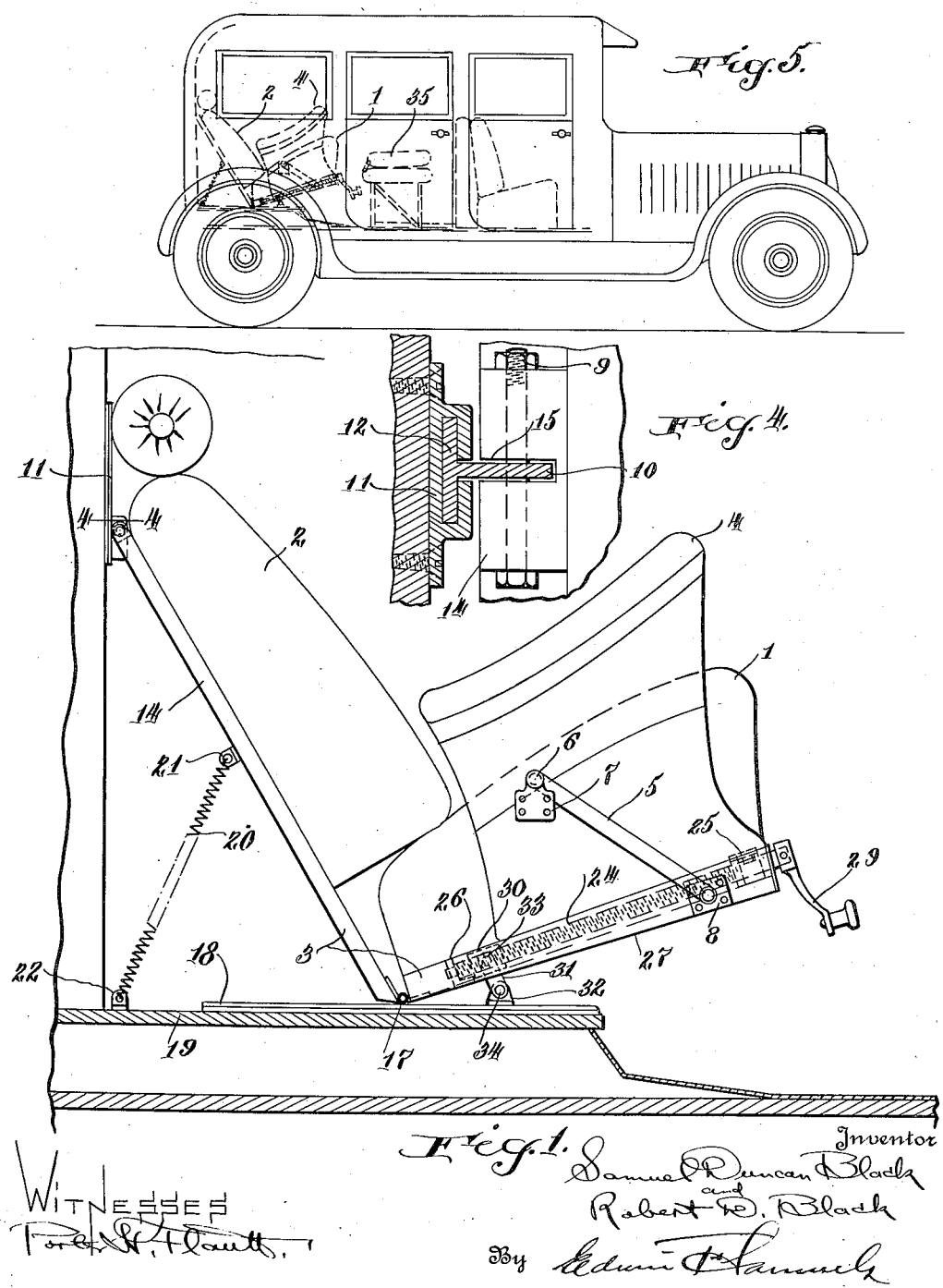

Patented Apr. 29, 1930

1,756,807

UNITED STATES PATENT OFFICE

SAMUEL DUNCAN BLACK AND ROBERT D. BLACK, OF BALTIMORE COUNTY, MARYLAND

VEHICLE SEAT

Application filed April 8, 1927. Serial No. 181,919.

In numerous instances enthusiastic drivers of motor cars have traveled long distances with the approximate speed of limited trains, but in doing this a great sacrifice of comfort and rest is involved.

The invention relates to the provision of a motor vehicle seat, particularly a rear seat, which may be conveniently adjusted from upright sitting position to a reclining position for sleeping or to any intermediate position to suit the traveler, giving a degree of comfort comparable to that of a Pullman car.

In the preferred form of the invention the entire seat, i. e., the back or back cushions, and the bottom or seat cushions are adjusted as a whole, maintaining the same angle to each other as in ordinary upright position. This gives the traveler the same effect as that obtained by tipping a cushioned chair back against the wall, a position which is generally regarded as embodying the maximum of comfort.

When the seat is placed in the rear of a seven passenger car this reclining position enables the passenger to rest his feet on one of the folding middle seats, the reclining position thus attained being one in which the passenger can sleep almost, if not quite, as comfortably as in a Pullman berth.

In the accompanying drawings we have illustrated a vehicle seat or chair embodying the features of the invention in the preferred form, and a motor vehicle equipped with such a seat.

In the drawings:

Figure 1 is a side elevation of the chair or seat adjusted to reclining position, adjacent portions of the vehicle being shown.

Figure 2 is an elevation of the same in normal or upright sitting position.

Figure 3 is a front elevation of such a seat in the same position and taken from a transverse sectional plane, cutting the vehicle from side to side.

Figure 4 is a detail view in the form of a section on the line 4—4 of Figure 1.

Figure 5 is a general view showing a motor vehicle equipped with a seat in accordance with the invention, the same being shown in dotted lines inside the vehicle and adjusted to reclining position and in connection with a folding seven passenger seat, which the passenger sitting in the adjustable seat may utilize as a foot rest.

Referring to the drawings by numerals, each of which is used to indicate the same or similar parts in the different figures, the adjustable vehicle seat or motor vehicle chair comprises a seat proper or bottom cushion 1, a back or back cushion 2 and a frame 3 by which they are preferably held in fixed relation to each other.

In the construction illustrated there are two seats formed integrally and moved together. These have arms or arm rests 4 at each side of each individual seat. Figure 3 shows one such arm at each side and one in the center.

The structure thus described is referred to as a motor vehicle chair or motor vehicle seat. This chair or seat, in the preferred form of the invention shown, is suspended from the side walls of the vehicle by means of links 5 one at each side, the links 5 being swung from pins 6 at their upper ends mounted in brackets 7 secured to the side walls of the vehicle and pivotally connected at their lower ends to brackets 8, or other suitable means secured to the chair or seat at the bottom and preferably near the front.

The back of the seat or chair at its upper end is preferably connected to the back of the vehicle and mounted to slide relatively thereto, being, in the form shown, provided for this purpose with T followers 12 pivotally connected thereto by means of transverse bolts or pins 9 passed through the central web 10 of the T, the cross web riding in a way or track 11 secured to the back of the vehicle in vertical position.

As shown, the upright portion 14 of the chair frame at the back is slotted at the top at 15 to receive the center web 10 of the T and the pin or bolt 9 is passed through the top of the upright 14 in a horizontal direction from side to side extending through the web 10 giving a pivotal connection of the follower to the back of the seat at the top. There may be as many of the uprights 14 and the followers 12 and ways 11 as are considered useful or desirable to guide the seat.

The bottom of the seat at the rear, which may be formed in any suitable manner as shown at 17, rides on a horizontal plate or other suitable way or means 18 supported on the rear seat platform or other support 19 at the bottom rear of the vehicle, and the seat is, in the form of the invention shown, held in position with this point 17 in close contact with the way to prevent rattling, by means of a tension spring or springs 20 secured to a lug 21 near the center of the back of the seat and to a lug 22 secured to the support or platform 19, or otherwise connected in any suitable manner.

The adjustment is accomplished by means of a screw or equivalent member 24 rotatively mounted in the bottom of the seat. As shown, it extends in a fore and aft direction and is mounted in suitable rotary and thrust bearings 25, 26 secured to the bottom frame 27 of the seat at the front and rear in any suitable manner. The screw may be operated in any convenient manner. As at present constructed it is provided with a hand crank 29 at the front, the same being at the bottom of the seat cushion 1.

The screw 24, preferably carried by the seat, engages for the purposes of adjustment of the seat a nut 30 mounted on the vehicle body to swing relatively thereto. In the form shown the nut 30 is connected by links 31 to a bracket or lug 32 on the rear seat platform 19, the links 31 being pivotally connected at 33 to the nut and at 34 to the lug.

As already stated in the description of the figures, the seat is shown in upright sitting position in Figure 2 and in adjusted reclining position in Figure 1. The seat is moved from the position, Figure 2, to the position, Figure 1, by rotating the screw 24 in any suitable manner as by means of the crank 29 and thereby moving the nut 30 to the rear along the screw or, more particularly, the nut being stationary except for the rocking motion on the short link 31, moving the seat forwardly relatively to the nut and the seat being suspended by the link 5 from the pin 6, the manner of mounting the nut, as described, permits it to swing relatively to the vehicle body providing for a change of angle of the screw as the seat rocks on the link 5 of the pin 6. At the same time the follower 12 slides toward its bottom position in the ways 11, guiding the top of the seat back in contact with the back wall of the vehicle body and the rear portion of the bottom of the seat at 17 slides forwardly on the ways 18, being held in contact therewith by the spring 20. The seat may thus be moved to a reclining position corresponding to the position of a chair tipped back against the wall at a comfortable angle and the passenger may, in a seven passenger car, in this reclining position of the seat rest his feet on deeply upholstered cushions supported by one of the center or seven passenger seats indicated in Figure 5 by reference character 35, giving a full reclining position comfortable for sleeping, or the seat may be easily adjusted to any intermediate position.

We have thus described specifically and in detail an adjustable vehicle seat embodying the features of our invention in the preferred form in order that the manner of constructing and using the same may be clearly understood, however, the specific terms herein are used descriptively rather than in a limiting sense, the scope of the invention being defined in the claims.

What we claim as new and desire to secure by Letters Patent is:

1. In combination with a vehicle seat and body, means for supporting the seat whereby a portion thereof is confined to a substantially arcuate path, and means for adjusting the angle of the seat and moving it upon said support comprising a screw mounted on the seat and a nut engaging the screw and means securing the nut to the body to swing relatively thereto.

2. A vehicle seat and means for adjusting the same from upright to reclining position comprising a guide and support for the bottom of the seat at the rear, a swinging support at the front of the seat and two cooperating adjusting members comprising a screw and a nut, one said member being mounted on the seat and the other said member being mounted on the vehicle body to swing relatively thereto.

3. A motor vehicle seat, means for supporting the same in upright position and in reclining position and means for adjusting the same from one position to the other and to intermediate positions, comprising a way guiding and supporting the bottom of the seat at the rear, means for supporting the front of the seat permitting the same to articulate, a fore and aft screw mounted in the seat, a nut engaging the screw, and means pivotally connecting the nut to the vehicle body.

4. In combination with a motor vehicle seat, means for supporting the same in upright position and in reclining position and means for adjusting the same from one position to the other and to intermediate positions, comprising a way guiding and supporting the bottom of the seat at the rear, a guide for the top of the back, means for supporting the front of the seat permitting the same to articulate, a screw mounted in the seat, a nut mounted on the vehicle body engaging the screw, a link pivotally connecting the nut to the vehicle body and spacing it away from the body, and means holding the seat in contact with the bottom guide.

5. A seat having a swinging support for the front, a sliding support for the rear and separate means for adjusting the seat about the swinging support, changing the location and position of the seat, rocking it from upright to reclining position and the reverse.

Signed by us at Towson, Maryland, this 6th day of April, 1927.

SAMUEL DUNCAN BLACK.
ROBERT D. BLACK.